Aug. 24, 1965 G. C. DACEY ETAL 3,202,887

MESA-TRANSISTOR WITH IMPURITY CONCENTRATION IN THE BASE DECREASING TOWARD COLLECTOR JUNCTION

Original Filed March 23, 1955 2 Sheets-Sheet 1

INVENTORS G. C. DACEY
C. A. LEE
W. SHOCKLEY

BY Arthur J Torsiglieri

ATTORNEY

INVENTORS: G. C. DACEY
C. A. LEE
W. SHOCKLEY
BY
Arthur J. Torsiglieri
ATTORNEY 3,202,887

MESA-TRANSISTOR WITH IMPURITY CONCENTRATION IN THE BASE DECREASING TOWARD COLLECTOR JUNCTION

George C. Dacey, Murray Hill, and Charles A. Lee, New Providence, N.J., and William Shockley, Los Altos, Calif., assignors to Bell Telephone Laboratories Incorporated, New York, N.Y., a corporation of New York Original application Mar. 23, 1955, Ser. No. 496,202, now Patent No. 3,028,655, dated Apr. 10, 1962. Divided and this application May 15, 1961, Ser. No. 109,934
3 Claims. (Cl. 317—234)

This invention relates to semiconductive devices, and more particularly of the kind generally described as junction transistors.

This is a division of application Serial No. 496,202 filed March 23, 1955, now Patent No. 3,028,655.

A junction transistor generally comprises a semi-conductive element, commonly of germanium, which includes a plurality of contiguous zones of different conductivity types defining one or more P-N junctions in the body. In the usual form of junction transistor, a germanium body comprises a base zone of one conductivity type, for example, p-type, which is intermediate between and contiguous with emitter and collector zones of opposite or n-type conductivity.

It is characteristic of the mode of operation of a junction transistor that minority charge carriers are injected into the base zone from the emitter zone under the control of signal information for travel thereacross to the collector zone, there giving rise to output currents in the circuitry associated with the collector zone. The injected carriers in the usual form of junction transistor move across the base zone largely as a result of diffusion, although it is possible by a proper gradient in the concentration of significant or conductivity-type determining impurity atoms in the base zone to establish a "built-in" electrostatic field which imparts a drift to the injected minority carriers to augment diffusion. It is characteristic of the role of the base zone in such operation that it, to a large degree, determines the output characteristics of the transistor. For uniformity of output characteristics from one transistor to another, it is necessary to have uniformity in the base zones among the transistors. Accordingly, it is important that the method of making such transistors be one which lends itself conveniently to good reproducibility of the base zones.

However, it is further characteristic of the role of the base zone in a junction transistor that particular configurations and impurity distributions are necessary therefor which militate against ready reproducibility. In particular, since the transit time for diffusion of the minority carriers across the base zone serves as an upper limit on the frequency of operation at which significant gain is realized, it is important for good high frequency response that the width of the base zone be narrow.

Hitherto, in fabricating junction transistors for use at high frequencies, the processes employed have not lent themselves well to good reproducibility on a mass production scale. For example, one common process is based on converting the conductivity type of opposite faces of a thin semiconductive wafer for forming emitter and collector zones on opposite sides of an unconverted intermediate zone which then serves as the base zone. Various specific processes based on this same general principle are known. However, it is evident that for accurate control of the width of the base zone in processes of this kind, it is necessary to control accurately both the width of the thin semiconductive wafer with which one begins, and depths of penetration into the wafer of the two converted surface zones. In particular, when the thicknesses of the emitter and collector zones are large in comparison with the desired width of the base zone, as is usually the case in transistors made by techniques of this kind, small fractional errors in the thicknesses of these emitter and collector zones and of the semiconductive body lead to large fractional errors in the final thickness of the base zone. Accordingly, uniformity of reproduction is difficult to achieve by such techniques, particularly when it is desired to reproduce accurately and in quantity transistors having base zones of a fraction of a mil in width.

Moreover, various other known processes for forming intermediate zones of one extrinsic conductivity type between two zones of opposite extrinsic conductivity type, for example, those which involve variations in growth rate or doping with significant impurities during the growing of a semiconductive crystal, also are not completely satisfactory or are of limited application for the large scale manufacture of semiconductive bodies having a precisely controlled thin intermediate zone of one extrinsic conductivity type between two zones of opposite extrinsic conductivity type.

Additionally, as indicated above, it is known that by a proper gradient in the concentration of significant impurity atoms in the base zone of a junction transistor there may be built into the base zone an electrostatic field which adds a drift velocity to the diffusion velocity of the minority carriers injected for travel thereacross. If such drift is made to augment diffusion, the time of transit across the base zone for such injected minority carriers may be reduced and the upper frequency limit of the transistor raised.

Accordingly, a characteristic of a transistor in accordance with this invention is a base zone in which the predominant significant impurity has a concentration gradient to impart such a drift velocity.

To this end, a transistor in accordance with the invention is characterized in that the base zone is formed by the diffusion of significant impurities in from one surface of the semiconductive element and the emitter zone is formed by the conversion of a portion of such surface region to the opposite conductivity type.

Another problem limiting the frequency response of junction transistors is the high capacitance associated with the emitting and collecting junctions.

To this end, a feature of one embodiment of a transistor in accordance with the present invention is a mesa structure in which the semiconductive element includes a bulk portion of larger cross section wherein is included the collector zone and a mesa portion of smaller cross section wherein is included the emitter and base zones.

As another feature of the preferred embodiment, the emitter zone has a linear geometry and the base electrode similarly has in linear geometry extending parallel to the emitter zone.

As another feature of a different embodiment, the emitter zone and base electrodes have concentric circular geometries.

The invention will be better understood from the following more detailed description taken in conjunction with the drawing in which.

The application of the principles of the invention will be described with reference to the fabrication of a germanium p-n-p junction transistor of typical design. It will, of course, be evident that the principles may be applied to transistors of other designs.

It is to be noted that the disparate values of the various dimensions involved make it inconvenient for the drawings to be to scale.

Figure 1A:
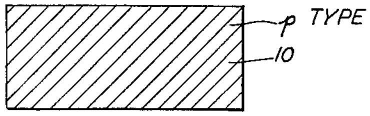
FIGS. 1A through 1G show in cross section in successive stages of its process of manufacture a diffused base junction transistor of the p-n-p type, in accordance with one embodiment of the invention.

With reference now to the drawing, FIG. 1A shows a germanium wafer 10 in cylindrical form which has a thickness, or height, of 10 mils and a radius of 50 mils. The germanium wafer is single crystal material of p-type conductivity, and advantageously of about 5 ohm-centimeter resistivity. Typically, such a resistivity and conductivity type is attained by doping the germanium melt, from which the single crystal is grown, with gallium.

As a preliminary step in the preferred embodiment of the process forming the invention, it is usually important to rid the surface of the wafer of all traces of undesirable impurities, especially copper which is a particularly active impurity in germanium. To this end, the wafer is advantageously soaked in potassium cyanide in accordance with a method described in United States Patent 2,698,780, issued January 4, 1955 to R. A. Logan and M. Sparks, and thereafter washed with deionized water and blotted dry.

The clean germanium wafer is now ready for the formation of a surface diffusion layer of n-type conductivity. An important characteristic of the preferred embodiment of the invention is the use of arsenic as the diffusant. Arsenic has proved especially amenable to accurate control, and accurate control of the diffused surface layer is vital to the process of the invention. The arsenic-diffused surface layer advantageously is formed in accordance with the vapor-solid diffusion method described in United States Patent 2,868,678, which issued January 13, 1959 to W. Shockley.

In accordance with this technique, the clean germanium wafer is loaded into a clean oven, preferably of molybdenum since such an oven can more readily be kept copper-free. There is also inserted into the oven a charge of germanium, most economically of polycrystalline material but of high purity, which has been doped with arsenic to have a body concentration of arsenic which is larger by a prescribed amount than the arsenic concentration desired for the arsenic-diffused surface layer to be formed on the wafer.

In particular, it is found advantageous to employ in this way germanium which has been doped to have a body concentration of approximately $10^{10}$ atoms/cubic centimeters of arsenic to provide an arsenic concentration at the surface of the diffused layer of the specimen being treated of approximately $2\times10^{17}$ atoms/cubic centimeters. The amount or arsenic in otherwise relatively pure germanium can be readily determined by resistivity measurements.

The germanium wafer is then heated in the oven at 800° C. for about fifteen minutes in the arsenic vapor which results from arsenic diffusing out of the heated polycrystalline germanium and an arsenic-diffused surface layer is formed on the wafer. It is characteristic of this diffusion process that the concentration of arsenic atoms will decrease in accordance with a complementary error function with increasing distance in from the surface of the wafer. It is this gradient in the concentration of arsenic atoms that gives rise to an electrostatic field in the base zone which acts to impart a drift velocity to the minority carriers injected from the emitter zone for travel across the base zone. In particular, in the specific embodiment being described, the heat treatment recited results in the formation of a surface diffusion layer about .18 mils thick with a surface concentration of $2\times10^{17}$/cm.$^3$ arsenic atoms resulting in a surface conductivity of approximately $10^{-2}$ mho per square centimeter. The arsenic concentration decreases with increasing distance into the wafer as previously discussed. It has been found advantageous to avoid exceeding a surface concentration of $10^{18}$ atoms/cubic centimeters of arsenic in this diffused layer in order to make feasible the formation of a good aluminum-fused emitter zone thereon.

In some instances, the process described may be modified by the inclusion of an outdiffusion step to provide a peak concentration of arsenic atoms at a region in from the surface and a reduced concentration on the skin in the manner described more fully in said W. Shockley patent. Such a skin of reduced arsenic concentration may be more readily adapted for use as an emitter zone.

Alternatively, a suitable arsenic-diffused surface layer may be formed in accordance with vapor-solid diffusion principles by heating an arsenic mass to a temperature which provides a suitable vapor pressure of arsenic and heating a germanium body in the presence of the arsenic vapor at a temperature suitable for diffusion of the arsenic into the wafer. Ordinarily, to avoid excessive surface concentrations of arsenic and at the same time achieve the desired amount of penetration of the arsenic, it is advantageous to have two zones of different temperatures and to heat the germanium wafer to a temperature higher than that used to vaporize the arsenic.

Figure 1B:
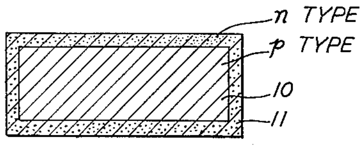

FIG. 1B shows the germanium wafer 10 over whose surface there is formed an n-type arsenic-diffused layer 11. In the completed junction transistor, the interior protion of this arsenic-diffused layer 11 serves as the base region.

It is characteristic of these surface diffusion techniques that the resistivity and thickness of the diffusion layer can be readily controlled to a high degree of accuracy since all of the parameters involved are amenable to accurate control. The concentration of arsenic atoms diffused into the surface of the germanium wafer can be made to have a prescribed value, and the depth of penetration of this diffusion layer may be accurately controlled by the temperature and heating time. Accordingly, since all of the factors which control the resistivity and depth of pentration of this surface diffusion layer are amenable to accurate control and can readily be reproduced as often as desired, it is easy to manufacture in quantities wafers having similar arsenic-diffused surface layers.

As a succeeding step of the process in accordance with the invention, there is formed an emitter zone of a portion of the skin of the arsenic-diffused surface layer.

Figure 1C:
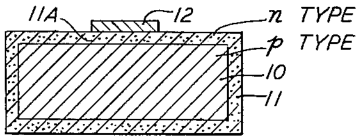

It is advantageous to form this emitter zone by the evaporation on a selected portion of the diffused surface layer of the wafer of a metallic significant impurity which permits ease of control of geometry, advantageously aluminum. To this end, it is important to mask those portions of the wafer which are to be kept free from the aluminum vapor during the evaporation process. Suitable masking techniques are known to one skilled in the art. Typically, the wafer may be supported in a structure which allows only a portion of the diffused surface layer of the wafer to be exposed to the aluminum vapor. It is desirable to observe precautions to prevent shadowing of the aluminum at the boundary of the film deposited. The process used for the evaporation should be one amenable to accurate control of the amount and the geometry of the aluminum deposited and advantageously one which does not involve appreciable heating of the germanium wafer. Suitable processes are described in a book entitled "Vacuum Techniques" by S. Dushman, J. Wiley and Sons, New York, New York (1949). In FIG. 1C there is shown a germanium wafer 10 which has an arsenic-diffused surface layer 11 on a portion 11A of which there is deposited a film of aluminum 12 in a circular spot of about 40 mils diameter and a thickness of approximately 1000 angstroms.

Figure 1D:
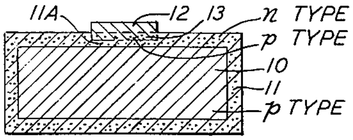

The aluminum film is then alloyed to the germanium wafer to form a p-type aluminum-alloyed skin on the portion 11A of the n-type arsenic-diffused zone on which the aluminum film has been deposited. The alloyage advantageously is accomplished by positioning the germanium wafer on a strip heater of the usual form and first heating the wafer to the aluminum-germanium eutectic temperature of approximately 424° C. in a hydrogen atmosphere for approximately one minute. This first part of the alloying cycle insures uniform wetting of the germanium surface by the aluminum, a factor which is important for good reproducibility of characteristics. Thereafter, in accordance with another feature of this preferred embodiment, as a second part of the alloying cycle, the germanium wafer is flash heated to about 700° C. for a very short interval, advantageously only about one-half a second for forming on the wafer surface a liquid phase which is about 55 percent aluminum and 45 percent germanium, in terms of the number of atoms, for alloyage of the aluminum to the germanium. It has been found advantageous that the time of this high temperature part of the alloying cycle be short in order to minimize contamination of the junction formed. It has been found that if the wafer is held at the elevated temperature for an extended period of time, the characteristics of the junction formed are relatively poorer. In FIG. 1D there is shown the germanium wafer after alloyage of the aluminum film to its surface. In crystallizing, a regrowth portion 13 of the portion 11A of the arsenic-diffused surface layer 11 is converted to p-type because of the introduction of aluminum from the aluminum film 12. Modifications are possible in this preferred technique for forming the aluminum fused emitter, such as heating of the wafer slightly above the eutectic temperature during evaporation of the aluminum film. It will be convenient to describe this technique which involves the recrystallization from a liquid phase of one or more components and the semi-conductor as fusing and the junction formed at the regrowth interface as a fused junction. This is to be distinguished from the technique described throughout as diffusion, which does not involve such recrystallization.

There is made available as a result of the steps described a semiconductive body which is a p-n-p conductivity type distribution. There is an n-type arsenic-diffused layer 11A between the p-type bulk 10 and the p-type aluminum-alloyed layer 13. For the formation of a p-n-p junction transistor, it is now only necessary to make appropriate electrode connections to the different zones of the body. In practice, it is found that there is a residual surface film of almost pure aluminum on the aluminum-alloyed p-type zone 13 which may be used advantageously as the emitter electrode, but it is generally preferable to deposit a metallic film on the arsenic-diffusd layer to serve as the base electrode.

Figure 1E:
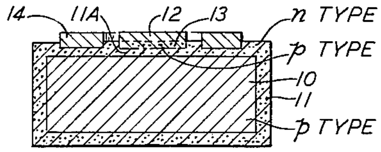

There is accordingly formed on selected portions of the diffused surface layer 11 as another step of the process a metallic film to serve as the base electrode connection. To this end, there is advantageously evaporated a thin film (approximately 400 angstroms) of a gold-antimony alloy (Au-.01% Sb) in an annular configuration surrounding the emitter electrode 12 formed on the surface of the body. Any technique of the many known may be used for the deposit of the gold-antimony film so long as it permits a high degree of accuracy in the geometry and the amount of the film deposited and yet avoids significant heating of the germanium body. After the gold-antimony film has been deposited, a heating cycle is used to alloy the film to the arsenic-diffused surface layer of the body. To this end, the germanium wafer is heated to about 356° C. (the gold-germanium eutectic) until such time as the film begins to alloy with the germanium and then the heat source is turned off before the alloyage of the film is complete. In particular, the heating is discontinued as soon as the gold-antimony film is observed to wet the wafer surface. FIG. 1E shows the germanium wafer of FIG. 1D on which there has been added a gold-antimony ring electrode 14 surrounding the aluminum emitter electrode 12.

Figure 2:
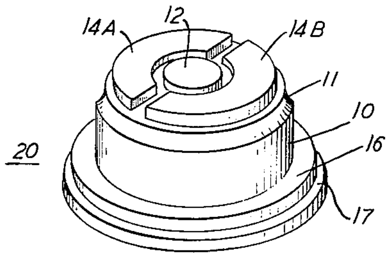
FIGS. 2, 3 and 4 show in perspective various embodiments of diffused base junction transistors fabricated in accordance with the process illustrated by FIGS. 1A through 1G.

Moreover, in the manufacture of a semiconductive unit for use as a tetrode junction transistor (i.e., one in which two spaced electrode connections are made to the base zone across which a D.-C. bias may be applied), instead of depositing a complete ring for surrounding the aluminum emitter electrode, two separate and spaced segments forming a split ring are deposited surrounding the aluminum emitter electrode as is shown in FIG. 2.

Figure 1F:
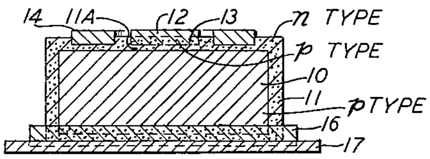
Figure 1G:
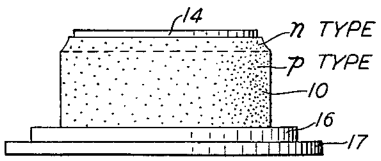

There still remains to form an ohmic connection to the bulk p-type portion of the body to serve as the collector electrode. To avoid having to remove the arsenic-diffused surface layer in the region to which connection is to be made, it is advantageous to solder through the arsenic-diffused surface layer for bonding the collector electrode to the interior of the wafer. In such a case, it is desirable to include an acceptor impurity in the soldering agent. To this end, in the preferred embodiment as shown in FIG. 1F, a mass of indium 16 has been used as a solder to bond a platinum tab 17 which serves as the collector electrode to the back face (the face opposite that of the emitter electrode) of the germanium wafer, the indium penetrating completely through the thin arsenic-diffused skin. Advantageously, the same heating step used for alloying the gold base film to one face of the germanium may be employed for alloying the collector electrode to the opposite face of the germanium. Then after the top face of the wafer has been suitably masked, the collector junction is revealed by placing the wafer for approximately forty seconds in a suitable acid etch, for example, CP–4 described in United States Patent 2,619,414 which issued November 25, 1952. The protective mask is then removed from the emitter face. FIG. 1G shows the wafer after the collector junction has been revealed by the acid etch.

FIG. 2 shows in perspective a tetrode junction transistor 20 of a design achieved in accordance with the process described in connection with FIGS. 1A through 1G. The design of this unit has been chosen for operation with collector currents as high as 500 milliamperes. The reference numerals used are the same used in the discussion of FIGS. 1A through 1G.

It finally remains to provide wire leads to the various electrode connections, which can be done in the usual fashion, and to encapsulate the assembly suitably.

Figure 3:
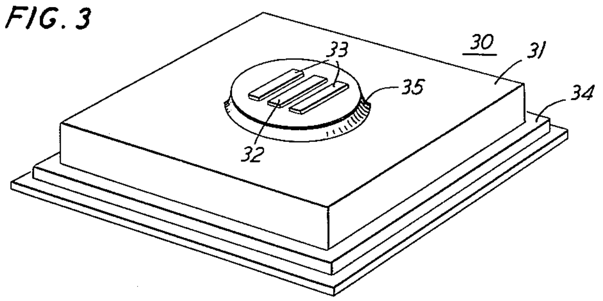

FIG. 3 shows in perspective a tetrode junction transistor 30 which has been fabricated in accordance with a process described to a design which is intended to extend the upper frequency limit of the operating range at the expense of the maximum collector current capacity. In this unit, the p-type germanium wafer 31 was initially a block 50 mils square and ten mils thick of single crystal material of approximately 5 ohm-centimeters resistivity. The depth of the arsenic-diffused surface layer is .028 mil and the arsenic concentration in this layer approximately $5\times10^{17}$ atoms/cubic centimeter. The emitter 32 is formed by the deposit of a film of aluminum one mil wide and six mils long. The gold-antimony base electrodes 33 have straight line geometries and are spaced on opposite sides of the emitter electrode, extending parallel thereto and spaced apart therefrom approximately one-half a mil. The line geometries of the emitter zone, the emitter electrode, and the base electrode are found especially advantageous for fabricating a unit designed for high frequency response. For example, the unit being described has an alpha cutoff frequency of about 180 megacycles per second. Finally, the collector boundary is revealed by a suitable etching in a circular pattern of about twelve mils diameter surrounding the emitter and base electrodes forming a mesa 35 as shown wherein are included the emitter and base zones. There is also provided a collector electrode 34 to the collector zone included in the bulk of the wafer.

Figure 4:
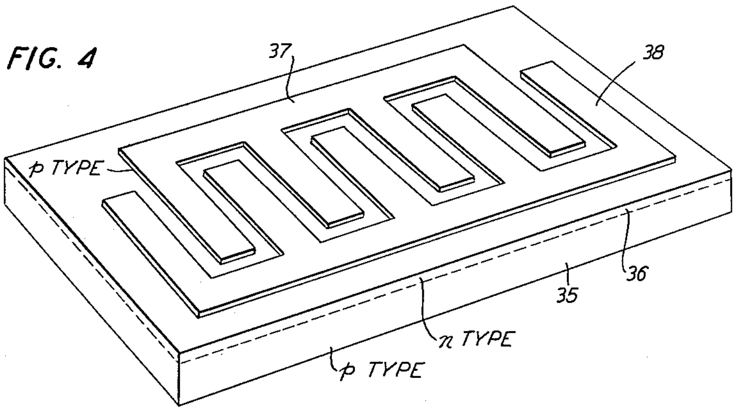

In FIG. 4, there is shown a semiconductive body 35 for use in a junction transistor made in accordance with the process described to have an emitter zone of alternative configuration. In this case, a p-type germanium body 35 has had diffused on one face thereof arsenic to form an n-type surface zone 36. Subsequently, an aluminum film of comb-like configuration has been evaporated on this surface zone and fused thereto for forming of the substrate skin portion thereof a p-type zone 37 which serves as the emitter. Additionally, a gold-antimony film of comb-like configuration interleaved with the emitter zone has been fused to the n-type surface zone for forming ohmic connection thereto to serve as the base electrode 38.

Figure 5:
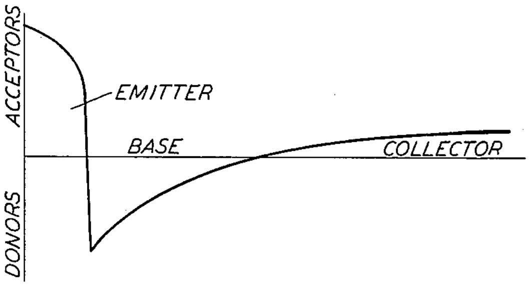
FIG. 5 is a plot of the concentrations of the predominant significant impurity atoms in successive zones of a junction transistor constructed in accordance with the process illustrated by FIGS. 1A through 1G.

In FIG. 5, there is plotted the relative concentrations of predominant significant impurities in successive zones of a junction transistor of the kind shown in FIGS. 2 and 3 constructed in accordance with the invention. The distance into the germanium wafer is plotted as the abscissa. Relative acceptor impurity concentrations are plotted as positive ordinate values and relative donor impurity concentrations as negative ordinate values. The emitter and collector zones are each seen to be characterized by a predominance of acceptor atoms, giving rise to p-type conductivity and the base zone by a predominance of donor atoms, giving rise to n-type conductivity. Additionally, the predominance of donor atoms is seen to decrease with distance away from the emitter zone in the direction of the collector zone. It is a gradient of this sort which gives rise to an electrostatic field which acts to reduce the time of transit across the base zone of injected holes, increasing thereby the upper limit of the useful operating frequency range. The general principles relating to the use of a built-in electrostatic field in this way are described in a copending application Serial No. 465,376, filed October 28, 1954, by W. G. Pfann, now Patent No. 3,059,123.

As has been indicated previously, various modifications are possible in the preferred embodiment which has been described in detail. First, for forming an n-type diffused surface zone which is to serve as the base zone, other donor elements may in some cases be used in place of arsenic. Typically, antimony, phosphorus and bismuth may be substituted. Moreover, for forming an ohmic connection to serve as the base electrode to the diffused base zone, alternatives such as a tin-antimony alloy may be used instead of the gold-antimony alloy described.

Additionally, in place of aluminum as the impurity in forming the emitter zone, other suitable acceptor elements may be employed, such as indium or boron. In particular, when an element such as boron is employed, it may be preferable to convert a skin portion of the first diffused-surface layer by a subsequent vapor-solid diffusion process. Typically, boron tetrachloride may be heated and the boron vapor allowed to diffuse into a shallow surface portion of the n-type diffused layer for converting it to p-type for use as the emitter zone. Additionally, ionic bombardment technique may be employed for forming the emitter zone.

Additionally, the collector electrode to the p-type bulk may, for example, be formed by use of a gold gallium alloy as a fusing agent in place of the indium described.

Moreover, it is feasible to fabricate germanium n-p-n junction transistors which have a diffused base zone in accordance with similar principles by an appropriate modification in parameters. In particular, aluminum and boron typically may be used as acceptor-type diffusants in forming the diffused base zone, and arsenic, phosphorus and bismuth as the donor-type impurities for converting a skin portion of this first formed diffused surface layer for use as the emitter zone.

Moreover, although germanium is usually the preferred semiconductive material for use in junction transistors, there are instances in which the semiconductive body is advantageously of some other material, such as silicon, a germanium-silicon alloy or a group III–group V compound such as indium-antimonide or aluminum-arsenide. Junction transistors utilizing semiconductive bodies of such materials advantageously may be fabricated in accordance with the general principles described by an appropriate selection of parameters.

Moreover, the principles of the invention may be extended readily to the fabrication of junction transistors of the kind described in the aforementioned Bell System Technical Journal which are characterized by an intrinsic zone intermediate between the base and collector zones for improved high frequency performance.

In the light of the foregoing, it is to be understood that the specific embodiments described are merely illustrative and various modifications will be obvious to a worker skilled in the art.

What is claimed is:

1. A junction transistor comprising a
   semiconductive wafer having emitter, base and collector zones, the emitter and base zones being included within a mesa located on the bulk portion of the wafer,
   emitter, base and collector electrodes connected to the emitter, base and collector zones, respectively,
   the emitter zone having a linear geometry and forming a minor portion of one surface of the mesa and the emitter electrode having a linear geometry and extending along the surface of the emitter zone,
   the base electrode having a linear geometry and extending along said surface of the mesa parallel to and substantially coextensive with the emitter electrode, and
   the concentration of the predominant impurity in the base zone varying from a relatively high value adjacent the emitter zone to a relatively low value adjacent the collector zone.

2. A junction transistor in accordance with claim 1 further characterized in that it includes a second base electrode parallel to and coextensive with the first-mentioned base electrode on the opposite side of the emitter electrode.

3. A PNP junction transistor comprising
   a germanium wafer having emitter, base and collector zones, the emitter and base zones being included within a mesa located on the bulk portion of the wafer,
   emitter, base and collector electrodes connected respectively to the emitter, base and collector zones,
   the emitter zone having a linear geometry and having aluminum as the predominant impurity therein,
   the emitter electrode having a linear geometry and substantially coextensive with the surface of the emitter zone,
   the base zone having a donor impurity concentration which varies from a relatively high value adjacent the emitter zone to a relatively low value adjacent the collector zone,
   the base electrode having a linear geometry and substantially parallel to and coextensive with the emitter electrode, and
   the collector zone comprising the bulk portion of the wafer.

References Cited by the Examiner

UNITED STATES PATENTS

| | | | |
|---|---|---|---|
| 2,736,849 | 2/56 | Douglas et al. | 317—235 |
| 2,821,493 | 6/58 | Parker | 317—235 |
| 2,840,494 | 6/58 | Carman | 317—235 |

DAVID J. GALVIN, *Primary Examiner.*

ARTHUR GAUSS, *Examiner.*